Oct. 8, 1946.  J. H. HAMMOND, JR  2,408,848
NAVIGATIONAL GUIDE SYSTEM
Filed Feb. 5, 1943  9 Sheets-Sheet 1
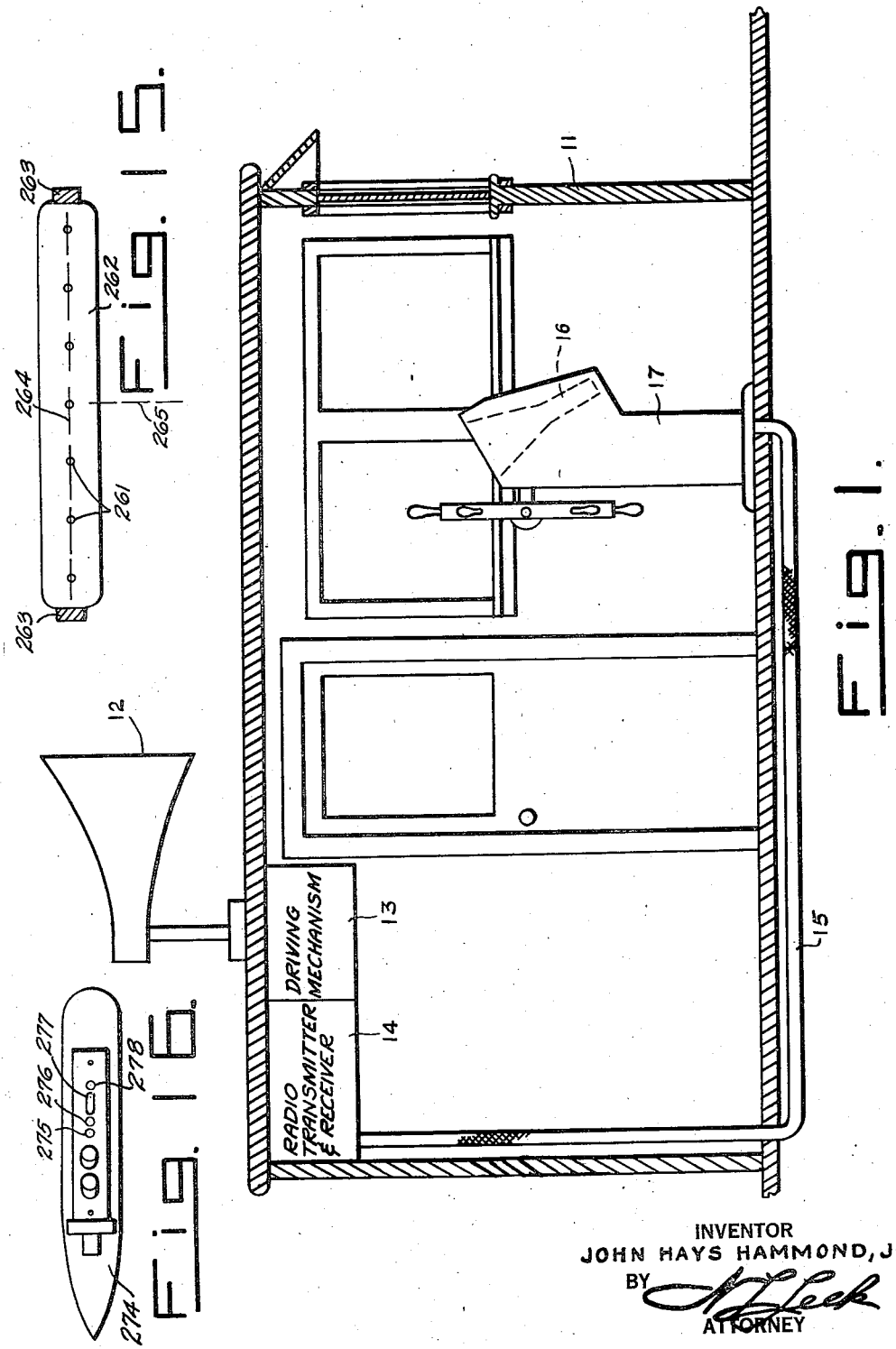
INVENTOR
JOHN HAYS HAMMOND, JR.
BY
ATTORNEY Oct. 8, 1946.  J. H. HAMMOND, JR  2,408,848
NAVIGATIONAL GUIDE SYSTEM
Filed Feb. 5, 1943  9 Sheets-Sheet 2

INVENTOR
JOHN HAYS HAMMOND, JR.

Oct. 8, 1946.    J. H. HAMMOND, JR    2,408,848
NAVIGATIONAL GUIDE SYSTEM
Filed Feb. 5, 1943    9 Sheets-Sheet 4

INVENTOR
JOHN HAYS HAMMOND, JR.
BY
ATTORNEY

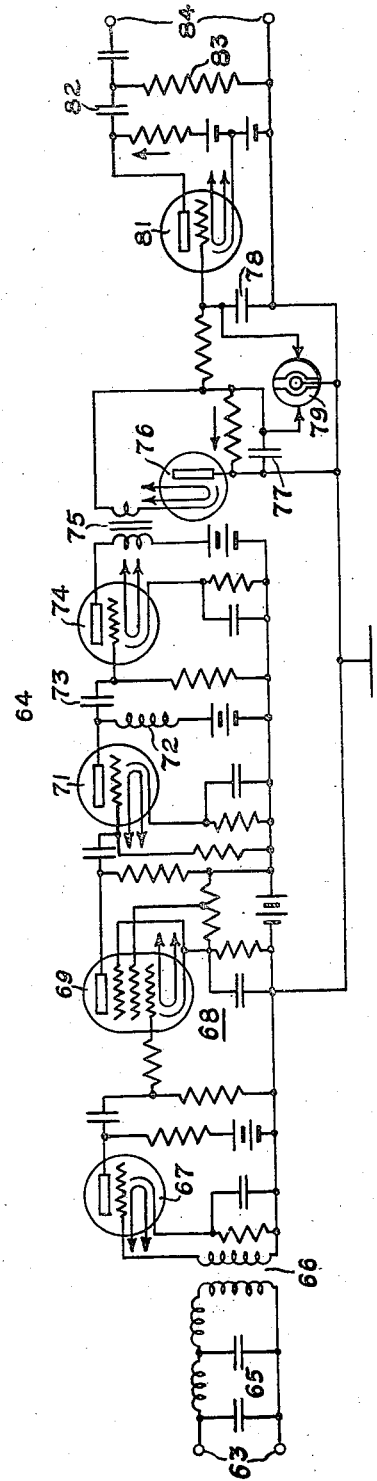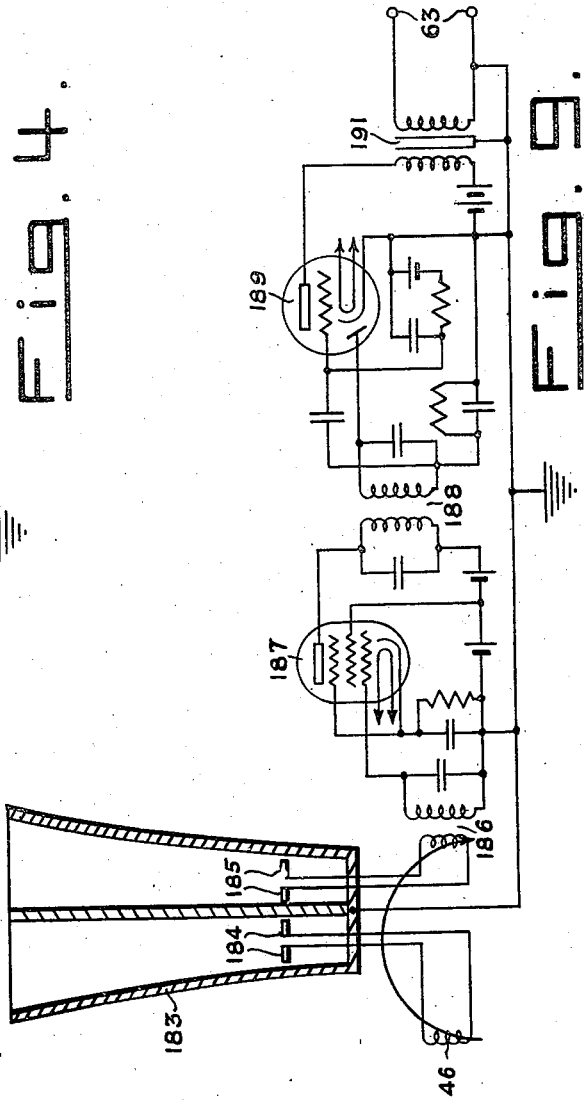

Oct. 8, 1946.  J. H. HAMMOND, JR  2,408,848
NAVIGATIONAL GUIDE SYSTEM
Filed Feb. 5, 1943  9 Sheets-Sheet 6

INVENTOR
JOHN HAYS HAMMOND, JR.
BY
ATTORNEY

Oct. 8, 1946.  J. H. HAMMOND, JR  2,408,848
NAVIGATIONAL GUIDE SYSTEM
Filed Feb. 5, 1943  9 Sheets-Sheet 8

INVENTOR
JOHN HAYS HAMMOND, JR.
BY
ATTORNEY

Oct. 8, 1946.　　　J. H. HAMMOND, JR　　　2,408,848
NAVIGATIONAL GUIDE SYSTEM
Filed Feb. 5, 1943　　　9 Sheets-Sheet 9

INVENTOR
JOHN HAYS HAMMOND, JR.
BY
ATTORNEY

Patented Oct. 8, 1946

2,408,848

UNITED STATES PATENT OFFICE 2,408,848

NAVIGATIONAL GUIDE SYSTEM

John Hays Hammond, Jr., Gloucester, Mass., assignor to Radio Corporation of America, a corporation of Delaware Application February 5, 1943, Serial No. 474,773

12 Claims. (Cl. 250—1)

This invention relates to navigational systems and more particularly to a system for determining the position of navigational markers by means of radio reflection.

The invention provides means for locating the position of fixed markers by sweeping the area with a radio beam and receiving the radio wave reflected from the marker on a position indicating device.

The invention also provides means for radiating a plurality of radio waves which are selectively reflected by different sets of markers.

The invention further provides means for reflecting the radio waves from the marker in a fixed direction, so that a definite angular position may be determined.

The invention also provides means for varying the reflective properties of the marker so that a different code signal is produced by each marker thus serving to identify the individual markers.

The invention also provides means for varying the number and configuration of the markers so that a definite code signal will be produced as the radio beam sweeps the marker system.

The invention further provides means for placing a system of reflectors upon ships so that the identity and the direction in which the ship is travelling may be ascertained from the reflected waves.

The purpose of this invention is to enable the navigator of a vessel approaching the shore to ascertain his location with reference to known fixed points along the shore line.

The invention also consists in certain new and original features of construction and combinations of parts hereinafter set forth and claimed.

Figure 1A:
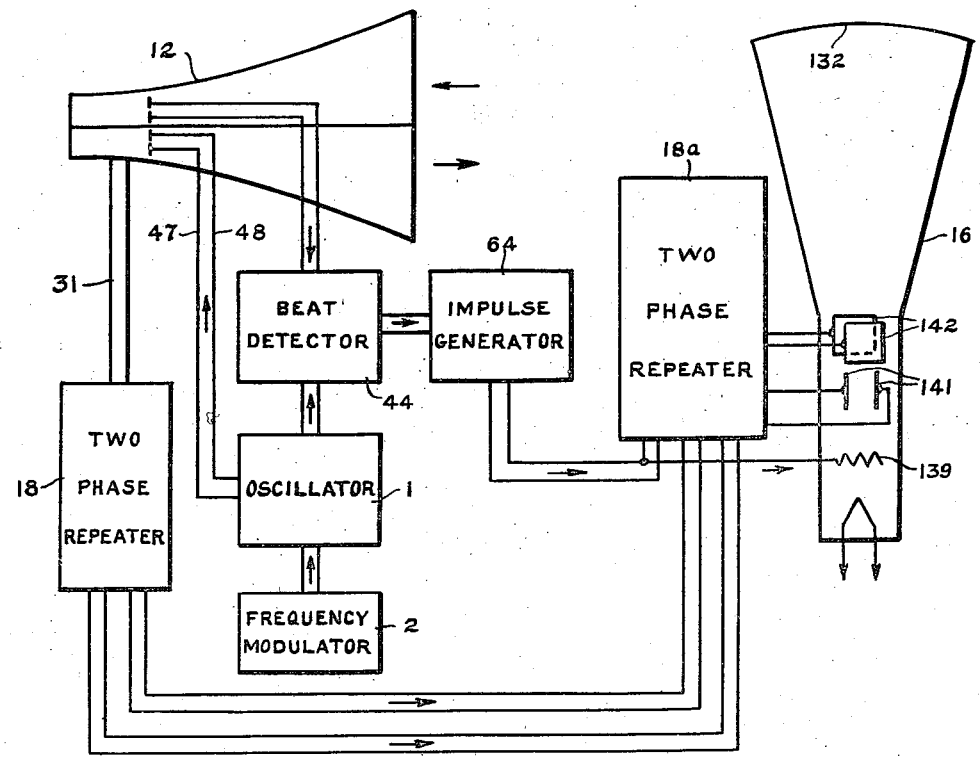
Figure 1B:
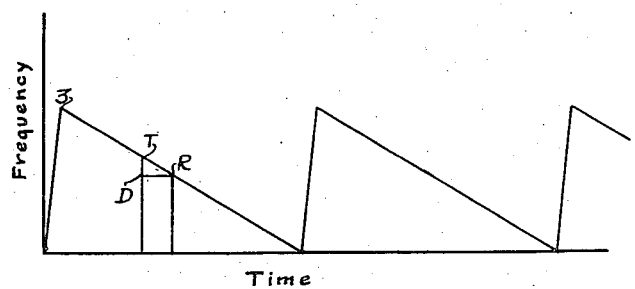
Figure 2:
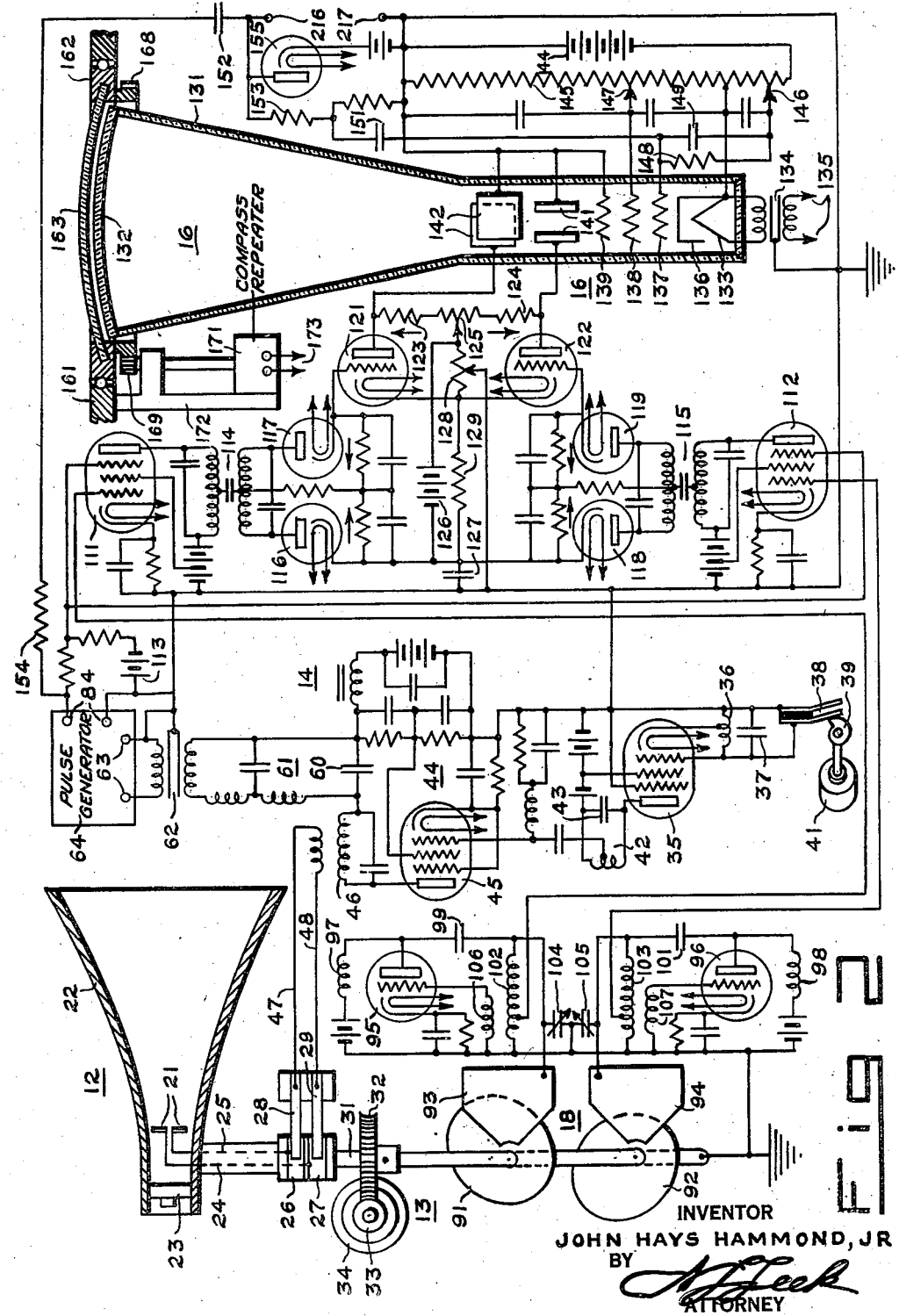
Figure 5:
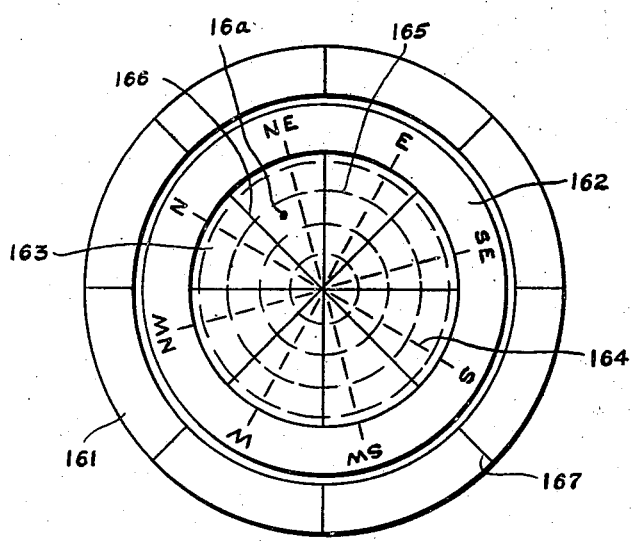
Figure 3:
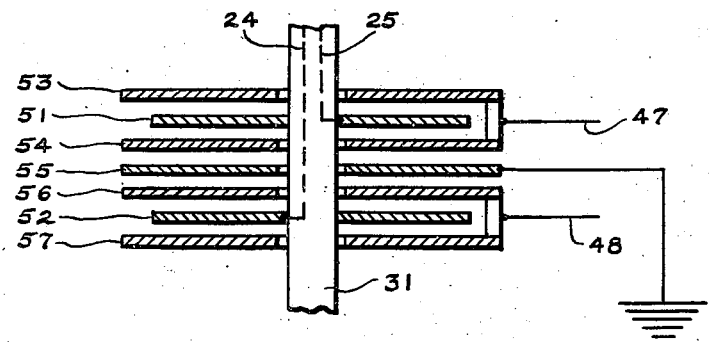
Figure 6:
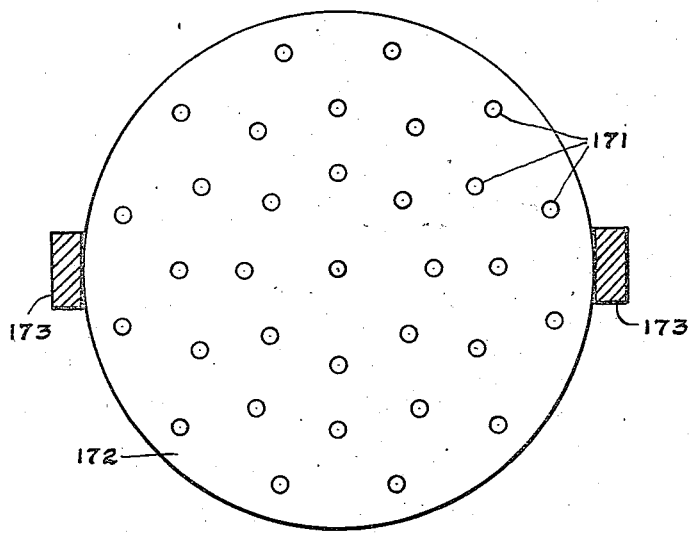
Figure 7:
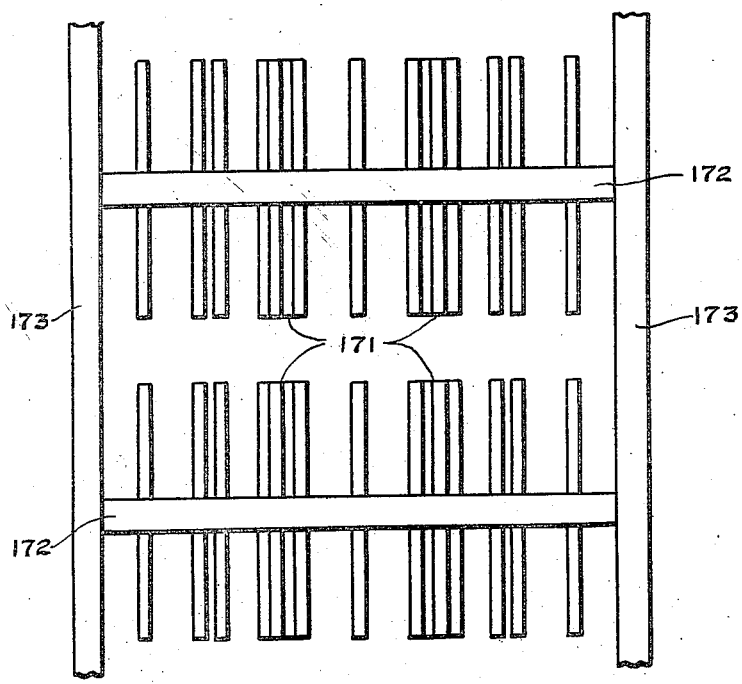
Figure 8:
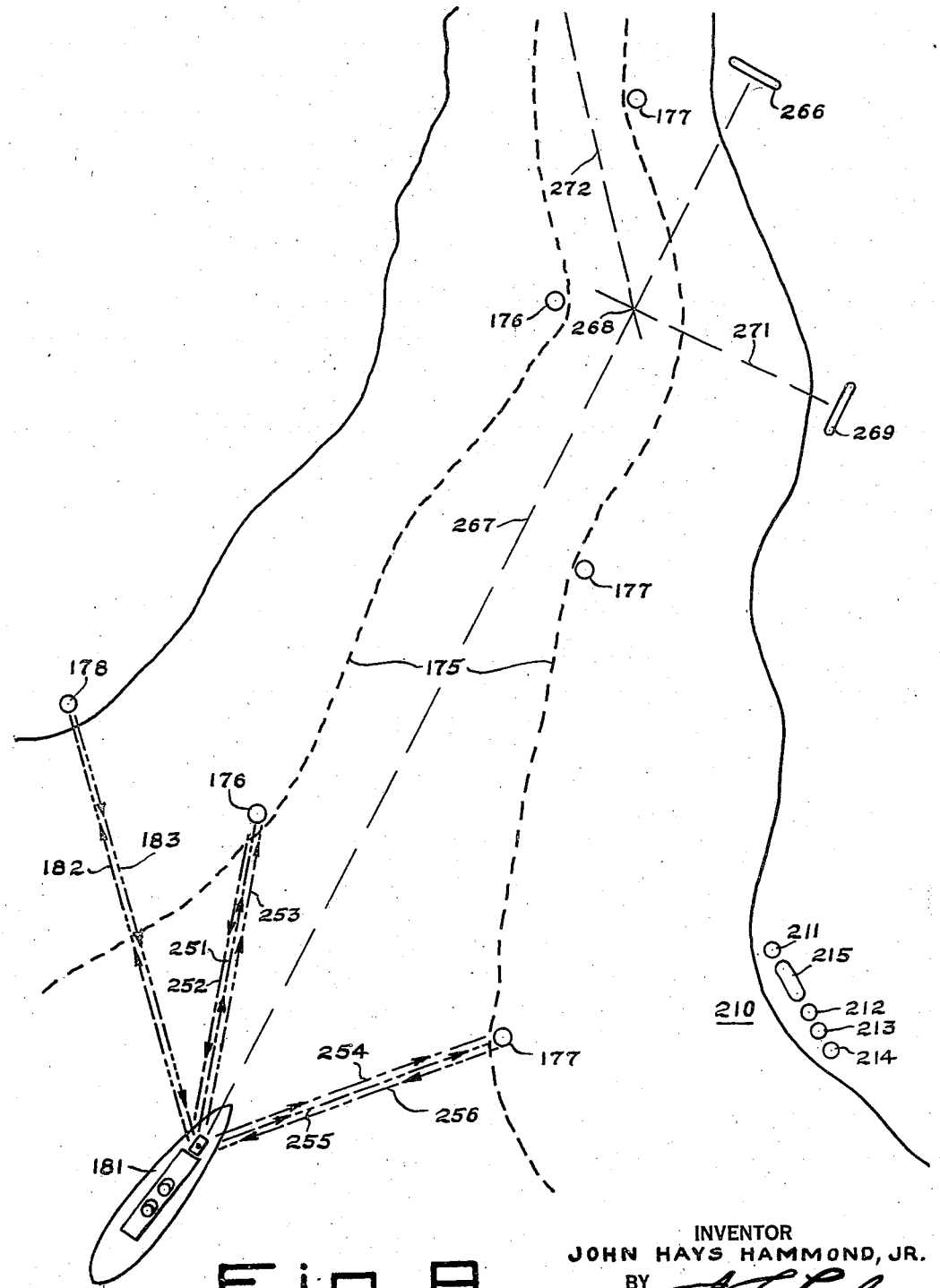
Figure 10:
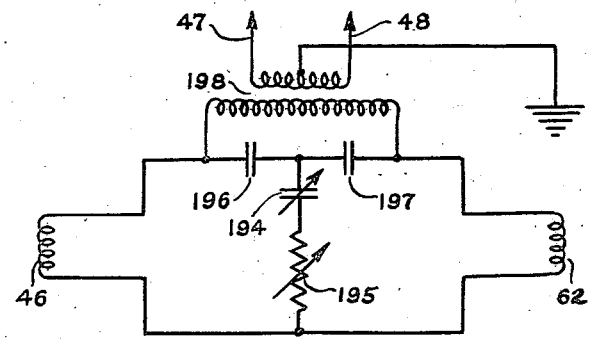
Figure 11:
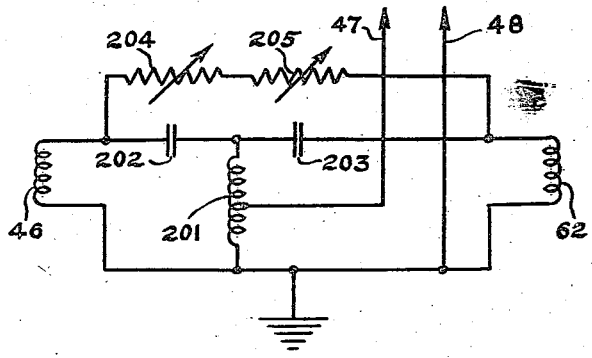
Figure 12:
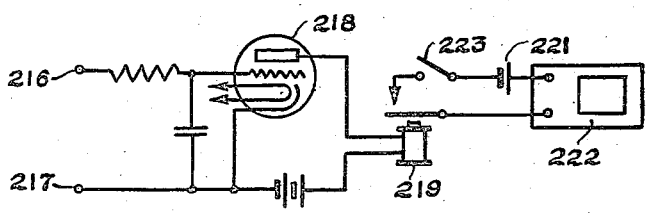
Figure 13:
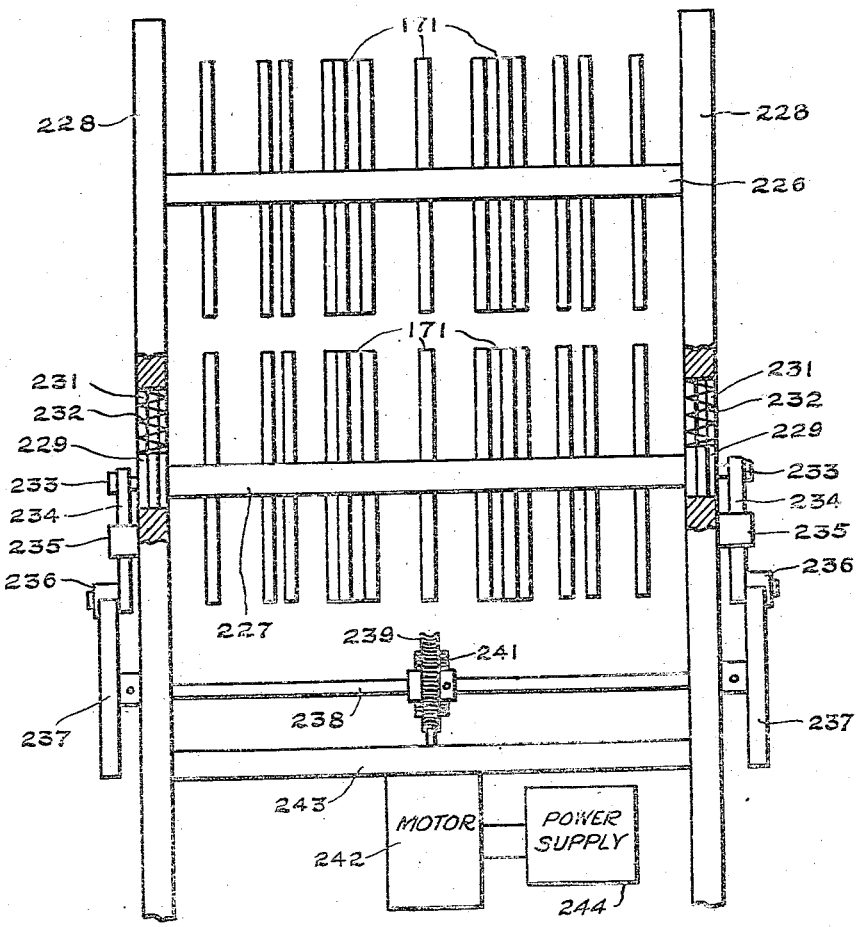
Figure 14:
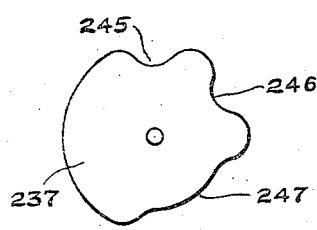

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Figure 1 is a sectional elevation of the pilot house of a vessel equipped with the present invention, Figure 1a is a block diagram illustrating the essential features of a system embodying the present invention, Figure 1b is a curve illustrating the operation of the system of Fig. 1a, Figure 2 is a schematic diagram of the transmitting and receiving circuits, Figure 3 shows a modified form of coupling mechanism, Fig. 4 is a diagrammatic illustration of an impulse generator forming part of the receiving circuit, Figure 5 is a plan view of the position indicator shown in Figures 1 and 2, Figure 6 is a plan view of one type of reflecting equipment, Figure 7 is an elevation of the reflector depicted in Figure 6, Figure 8 is a plan view of a harbor provided with a plurality of reflecting systems, Figure 9 illustrates a modified type of transmitting and receiving apparatus, Figures 10 and 11 are schematic diagrams of modified forms of the combining circuit, Figure 12 is a schematic diagram of an audible indicating system, Figure 13 is a side elevation of another modified form of reflecting system, Figure 14 is a detail view of the cam used in the system of Figure 13, Figure 15 is a plan view of a directive reflecting system, and Figure 16 is a plan view of a vessel illustrating a vessel identification system.

Like reference characters denote like parts in the several figures of the drawings.

In the following description parts will be identified by specific names for convenience, but they are intended to be as generic in their application to similar parts as the art will permit.

Referring to the accompanying drawings, and more particularly to Figure 1, the pilot house of a vessel is indicated at 11. Rotatably mounted on the roof of the pilot house 11 is a directional horn antena transmitting and receiving system 12, which is rotated by a driving mechanism 13, and is connected to a combined radio transmitter and receiver 14. The receiver 14 is connected by a cable 15 to an oscilloscope 16 mounted in the steering wheel pedestal 17.

The oscilloscope 16 is in the form of a cathode ray tube having a fluorescent screen 132 (Figs. 1a and 2) with an adjustable graduated screen 163 (Figs. 2 and 5) through which the cathode ray spot 16a (Fig. 5) is viewed. The system is designed so that the angular position of the spot 16a on the screen 132 indicates the direction of the object from which the reflected waves are received and the radial distance of the spot 16a from the center of the screen 132 is proportional to the distance of the vessel from such object.

The system for accomplishing this is indicated in block diagram in Fig. 1a as embodying a directional short wave transmitting and receiving antenna system 12 which is rotated in azimuth on a shaft 31. A two phase repeater 18 is connected to produce in a repeater 18a, two phase current having a frequency corresponding to the speed of rotation of the shaft 31. This current is supplied to deflection plates 141 and 142 of the cathode ray tube 16 and causes the spot 16a to maintain an angular position corresponding to the angular position of the antenna system 12. The spot 16a, however, only appears when a reflected wave is received, as will be described. Hence its angular position on the screen 132 indicates the direction of reception of such waves.

The distance measuring circuits which control the radial displacement of the spot 16a from the center of the screen 132 comprise an oscillator 1 and a frequency modulator 2 connected to modulate the frequency of the oscillator to conform to the curve 3 of Fig. 1b. The frequency is caused to progressively decrease linearly with respect to time and is then quickly restored to its initial value and the cycle repeated.

The oscillator output is fed by lines 47, 48 to radiating dipoles of the antenna system 12 to produce a wave in the form of a directed beam which is radiated from the antenna system.

When reflected from a distant object the reflected wave is received by the antenna system 12 and is fed to a beat detector 44 where it is combined with energy fed directly from the oscillator 1, to produce a beat note. If the radiated wave, for example, is of a frequency represented by the point R on the curve 3 the reflected wave will have the same frequency. At the time the reflected wave is received, however, the transmitted wave may have a frequency T. The distance RD (Fig. 1b) represents the time required for the emitted wave to travel to the reflecting object and return. Hence the beat frequency TD is a measure of the distance of such object.

The beat frequency in the detector 44 is converted, by an impulse generator 64, to an impulse having an amplitude proportional to the beat frequency.

The two-phase repeater 18a and the tube 16 are normally blocked so that no spot appears on the screen 132. The impulse from the impulse generator 64 is caused to unblock the repeater and to cause a potential to be applied to the deflector plates 141 and 142 by the repeater which is proportional in amplitude to said impulse but has a phase relationship determined by the repeater 18, thereby causing the spot 16a to be deflected radially by a distance proportional to the amplitude of the deflecting impulse which in turn is proportional to the distance of the reflecting object. At the same time, the impulse is applied to the control grid 139 of the tube 16 which unblocks said tube and causes the cathode ray to produce the spot 16a. The screen 132 may have suitable graduations to indicate angular position and radial deflection so that the helmsman can readily observe the direction and distance to the fixed object such as a navigational marker.

One specific circuit which is suitable for the above purpose is shown in Figs. 2 and 4.

Referring to Figure 2 the antenna system 12 comprises a dipole radiator 21 which is mounted near the throat of a metallic horn casing 22. The base of the horn 22 is provided with an adjustable piston 23 for tuning purposes. The two elements of the dipole 21 are connected by two conductors 24 and 25 to two slip rings 27 and 26 which are engaged by two brushes 28 and 29. Secured to the horn shaft 31 is a worm gear 32 which meshes with a worm 33 mounted on the shaft of a motor 34 which is driven at constant speed from any suitable source of power not shown. If found desirable a mechanism may be provided for disconnecting the worm drive and providing a handle attached to the shaft 31, which may be used for rotating the horn 22 manually.

The transmitter 14 includes an electron coupled oscillator 35 the frequency of which is determined mainly by the L and C values of an inductance 36 and a condenser 37 and to a less degree by the capacitance of a variable condenser 38 which is mechanically operated by a cam 39 driven at constant speed by a motor 41. The cam 39 is so designed that the capacity of the condenser 38 builds up gradually and linearly to a maximum and then upon release by the cam the capacity quickly becomes a minimum and immediately starts again to build up to a maximum, so that the oscillator frequency follows the curve 3 of Fig. 1b as above described.

The output circuit of the oscillator 35 is connected to a frequency doubler 42 including a tuning condenser 43, which doubles the frequency by tuning the plate circuit to double the oscillator frequency. The frequency doubler 42 is connected to a power amplifier 44 which includes a pentode 45 the plate circuit of which is also tuned to the double frequency and includes the primary of a transformer 46 the secondary of which is connected to the brushes 28 and 29 by conductors 47 and 48 of a transmission line.

If found desirable the slip rings 26—27 and brushes 28—29 may be replaced by a pair of capacitors as shown in Figure 3 for transmitting the energy to the radiator. In this system two circular plates 51 and 52 are attached to but insulated from the shaft 31 and are connected to the two conductors 25 and 24. Surrounding the shaft 31 are five fixed circular plates 53—57 which are provided with holes so that they do not touch the shaft 31. The two fixed plates 53 and 54 are connected together and to the conductor 47, the two fixed plates 56 and 57 are connected together and to the conductor 48 and the fixed plate 55 is grounded. The plates 51—57 are designed for constancy of capacity, so that the dielectric between the station plates 53—54 and 56—57 and the rotor plates 51 and 52 furnishes a frictionless and substantially electrically perfect substitute for the slip rings 26 and 27 for energy transfer purposes.

The power amplifier 44 also constitutes a beat detector the output circuit of which includes a condenser 69 across which is connected a filter circuit 61. The filter circuit 61 is connected thru a transformer 62 to the terminals 63 of an impulse generator 64, which is shown in more detail in Figure 4. This circuit may be of any well known type for converting variations of signal frequency to variations of signal intensity. The input terminals 63 are connected thru a filter circuit 65 (Fig. 4) and a transformer 66 to the input circuit of an audio amplifier 67. The output circuit of the amplifier 67 is connected to a limiter 68 which includes a pentode 69.

The output circuit of the limiter 68 is connected to the input of a tapered frequency discriminator tube 71 which amplifies higher frequencies more strongly than low frequencies which is accomplished by the choice of the coupling elements in the discriminator output circuit such as a choke 72 in the plate lead and a coupling condenser 73, which is connected from the plate of the tube 71 to the input of a rectifier driver tube 74. The rectifier driver tube 74 is connected thru a transformer 75 to a diode rectifier 76, the transformer 75 being suitably designed to improve the frequency characteristics of the transmission from the grid of the discriminator amplifier 71 to the rectifier 76.

Two output condensers 77 and 78 are connected in the output circuit of the rectifier 76 and a motor driven switch 79 is provided for simultaneously grounding both of the condensers 77 and 78. The switch 79 may be operated in synchronism with the modulation cam 38; such as by direct mechanical connection. The integrated voltage output of the rectifier 76 is impressed upon an impulse tube 81 coupled by a condenser 82 to a load resistor 83 which is connected to the output terminals 84.

Secured to the shaft 31 of the rotating horn system 12 shown in Fig. 2 are two elongated condenser rotor plates 91 and 92 of nearly identical shape but with one displaced 90 degrees with respect to the other. Mounted adjacent to the two rotor plates 91 and 92 are two fixed plates 93 and 94 which with the rotor plates 91 and 92 form two variable condensers which are formed and adjusted in such a manner that one condenser is at a maximum when the other condenser is at a mean value.

The variable condensers 91—93 and 92—94 are operatively connected to two oscillator triodes 95 and 96 which may be operating at different frequencies. The plates of the triodes 95 and 96 are shunt fed thru chokes 97 and 98 and are coupled thru blocking condensers 99 and 101 to the oscillatory circuits formed by coils 102 and 103 and main condensers 104 and 105. The main condensers 104 and 105 are paralleled by the variable condensers 91—93 and 92—94. Oscillations are produced by inductive coupling of grid coils 106 and 107 to the coils 102 and 103 respectively.

Output connections are made at taps on the coils 102 and 103 and are connected to the first grids of two pentodes 111 and 112 respectively. The third grids of the pentodes 111 and 112 are connected together and to the output terminals 84 of the impulse generator 64 and are normally biased beyond cut off by battery 113. The plate circuits of the pentodes 111 and 112 are connected thru frequency discriminating transformers 114 and 115 to two sets of rectifiers 116—117 and 118—119 which are so connected in a back to back arrangement that the outputs are in opposition. The cathodes of the rectifiers 117 and 119 are connected to the grids of two triodes 121 and 122, the plates of which are connected to a resistor assembly comprising output resistors 123 and 124 and a balancing potentiometer 125 the adjustable contact of which is connected to one side of a battery 126 the other side of which is connected to ground thru a condenser 127. Connected across the battery 126 is a potentiometer 128 and the cathode biasing resistor 129.

The oscilloscope 16 is of standard and well known construction the details of which form no part of the present invention. The oscilloscope 16 is shown as comprising a glass tube 131 the upper end of which forms a fluorescent screen 132, the fluorescent material of which is of such a nature that it maintains its fluorescence for an appreciable time, for example several seconds after being excited by the electron ray. In the tube 131 are mounted the heater element 133 which is supplied with current thru a transformer 134 from any suitable source 135, the cathode 136, which is connected to one side of the heater 133, the control grid 137, the focusing electrode 138, the accelerating anode 139 and the two sets of deflection plates 141 and 142. One plate of each of the sets of deflection plates 141 and 142 is connected to the plates of the tubes 122 and 121 respectively. The other plates of the sets 141 and 142 are connected to the anode 139 and to the ground.

For operating the oscilloscope 16 a source of high potential is provided, which in this case is shown as a battery 144 shunted by a potential divider 145 provided with two adjustable taps 146 and 147. The tap 146 is connected thru a control grid resistor 148 and condenser 149 to the control grid 137, which is connected thru two blocking condensers 151 and 152 and two resistors 153 and 154 to one of the terminals 84 of the impulse generator 64. A limiter tube 155 is provided to cut down the impulse when it exceeds a value necessary to give good illumination.

The oscilloscope 16 is mounted in the steering wheel pedestal 17 the top 161 of which is circular in shape and forms the position indicator as shown in Fig. 5. Rotatably mounted in the top plate 161 is an annular ring 162 in which is set a plate 163 of curved glass or other transparent material. Engraved in dotted lines on the glass plate (Fig. 5) are the points of the compass 164 and concentric circles 165 denoting distances from the center. Engraved on the fluorescent screen 132 are radial lines 166 denoting the lubber line of the vessel and lines making definite angles with the lubber line. Extensions of the lines 166 are engraved as lines 167 to the top plate 161. Secured to the under surface of the annular ring 162 is a gear 168 which meshes with a pinion 169 mounted on the shaft of an electrical repeater 171 which is fastened to a bracket 172 secured to the top plate 161. The electrical repeater 171 is connected by a cable 173 to the electrical transmitter of the ship's gyro compass and operates in a well known manner so as to cause the ring 162 and glass plate 163 to act as a compass repeater.

In Figs. 6 and 7 is illustrated one type of reflecting system that may be used in connection with the present invention. This reflecting system comprises a plurality of metalic rods 171 mounted vertically in one or more plates 172 of insulating material which are shown as supported by two uprights 173. The rods 171 are of a length equal to half the wave length of the energy radiated by the dipole 21 and are so arranged that the intensity of energy reradiated from them will be substantially uniform in all directions in a horizontal plane.

In Fig. 8 is shown a plan view of a harbor in which the channel is indicated by the dotted lines 175. On one side of this channel are a plurality of buoys 176 and on the other side a plurality of buoys 177. These buoys may be provided with reflecting systems similar to those shown in Figs. 6 and 7. Similar types of reflecting systems may be located at any desired places along the shore or at a lighthouse as indicated at 178. A vessel entering the harbor is indicated at 181.

In the operation of the system described a vessel 181 is provided with the transmitting system 12 which is rotated by the motor 34. This may be a complete rotation at a uniform speed as is shown in Fig. 2 or the horn 22 may be caused to sweep back and forth thru a restricted arc by any well known type of mechanism.

The electron coupled oscillator 35 produces energy the frequency of which is determined by the constants of the inductance 36 the fixed condenser 37 and the variable condenser 38 which is varied by the rotation of the cam 39. The cam 39 is so designed that the capacity of the condenser 38 builds up gradually and lineally to a maximum and then upon release by the cam the capacity quickly drops to a minimum and then immediately starts to build up to a maximum again. The cam 39 is operated on a timing interval which is long in comparison with the time required for the radiant energy to be transmitted, reflected and received.

The output of the oscillator 35 is doubled in frequency by the doubler circuit 42 and is fed to the control grid of the pentode 45 the plate circuit of which is also tuned to the double frequency. The output energy of the pentode 45 is fed thru the transformer 46 and over the transmission lines 47—48 to the brushes 28—29, thence thru the slip rings 26—27 and conductors 24—25 to the dipole radiator 21.

If the capacitors 51—57 as shown in Fig. 3 are used instead of the slip rings 26—27 the energy is transmitted to the rotating shaft electrostatically instead of by conduction. In this way a substantially electrically perfect substitute for the slip rings is provided which eliminates any disturbing effects produced by the motion of the slip rings under the brushes which in practice might cause considerable difficulty.

The energy radiated by the dipole 21 is directed in a concentrated beam indicated by the broken line 182, which sweeps around in a horizontal plane due to the rotation of the horn 22. When the beam 182 impinges on the reflector 178 each of the rods 171 acts as a miniature radiator and reradiates the energy received in all directions. A small amount of this reradiated energy is received by the dipole 21 as indicated by the broken line 183. This received energy then passes back over the transmission line 47—48 to the transformer 46 where it is fed into the plate circuit of the pentode 45. Here it is heterodyned with the current existing in the pentode 45 to produce a low frequency current the frequency of which corresponds to the distance of the reflector 178. The transmitter power supply must be substantially free from ripple because of the weakness of the received signals and the small magnitude of the low frequency currents produced by the heterodyning process.

These low frequency currents are impressed across the condenser 60 and are filtered by the filter circuit 61 to free them from undesirable high and low frequency currents. In this way signals reflected from greater distances than it is desired to cover by the visual position indicator may be eliminated. These low frequencies then pass thru the transformer 62 and are impressed upon the impulse generator 64.

The stray reflected disturbances from beyond the range of the oscilloscope are eliminated by the filter 65, Fig. 4, and the audio frequency signal after passing thru the transformer 66 is impressed upon the amplifier 67. With the modulations of a linear saw tooth nature the tone corresponding to a reflector at a given distance is constant during the time that the frequency is slowly varying. The noise or tone resulting when the cam 39 quickly changes the capacity of the condenser 38 will be of a much higher pitch and is either blanked out by the audio filter 65 or may be blanked out artificially by a mechanical connection from the cam 39 to the receiver which will prevent the tube of the amplifier 67 from amplifying when the cam 39 is resetting the modulation to the normal linear nature.

The output of the amplifier 67 is impressed upon the limiter 68 the action of which is the first step in processing the beat tone to make the impulse depend upon the frequency and not upon the strength of the beat note. As a result of this limiting action the output of the limiter is of constant level regardless of the input over a wide range of input levels. The limiter shown is symbolic of what can be accomplished with more perfect but more complex designs which are not a part of the present invention and are not here discussed.

The output of the limiter 68, which is of constant level, is impressed upon the tapered frequency discriminator tube 71 which amplifies the high frequencies more strongly than the low frequencies. This is accomplished by the choice of proper constants for the choke 72 and the condenser 73 which, in effect, constitutes a high pass filter which with the proper design can produce a fairly linear relation between input frequency and output signal strength when the strength of the input signal remains constant.

The output of the discriminator tube 71 is impressed upon the rectifier driver tube 74 the energy from which passes thru the transformer 75 to the diode rectifier 76. The design of the transformer 75 is such as to improve the frequency characteristics from the grid of the discriminator tube 71 to the rectifier 76. The rectifier 76 is of an integrating type with the voltage across the output condensers 77 and 78 gradually building up during the cycle of modulation. The output arrangement is such that the integrated voltage is impressed upon the impulse tube 81. The rate of rotation of the cam 39 is slow and the condenser 82 is sufficiently small so that there is little or no voltage transferred to the load resistor 83 while the charges on the condensers 77 and 78 are building up.

Impulses are created by the discharging of the condensers 77 and 78 by the rotary switch 79 which grounds both of the condensers simultaneously and resets the device for further operation. The switch 79 may be operated in synchronism with the cam 39. The voltage across the condenser 78 just prior to its discharge by the switch 79 is substantially proportional to the frequency impressed upon the input terminals 63 and is therefore proportional to the distance of the reflector 178 from the vessel 181.

The impulse tube 81 is energized by the quick change of its grid voltage and the impulse on the grid is transferred thru the output condenser 82 to the output terminals 84. As the charge on the grid condenser 78 increases to make the grid of the tube 81 more positive the plate current is gradually increasing and the plate voltage decreasing. When the condenser is mechanically discharged the plate current drops to a small value, the plate becomes more positive and a positive surge or impulse passes to the output terminals 84. The general shape of this pulse is not dependent upon the input signal but the strength is dependent solely upon the frequency of the input to the input terminals 63.

In order to make the angular position of the spot on the oscilloscope 16 correspond to the angular position of the horn 22, the two phase repeating device 18 is used for producing this effect by entirely electrical means. As the shaft 31 rotates the two condensers 91—93 and 92—94 are varied so that when one condenser is at a maximum the other will be at a mean value. As these condensers are operatively connected to the oscillators 95 and 96 the frequencies of these two oscillators will vary with the result that two currents are produced each frequency modulated. Due to the design of the condenser plates the frequency modulations are sinusoidal but differ by 90 degrees so that when one oscillator is at a maximum or minimum the other is at a mean value.

The frequency modulated outputs of the oscillators 95 and 96 are impressed upon the first grid to ground circuits of the pentodes 111 and 112 respectively. The third grids of the pentodes 111 and 112 are normally biased beyond plate current cut off so that energy from the oscillators 95 and 96 do not pass through the pentodes 111 and 112 until the third grids are momentarily energized from the output of the impulse generator 64. When this occurs the pentodes 111 and 112 operate as amplifiers and the plate circuits are actuated in accordance with the strength of the impulse.

Energy from the plates of the pentodes 111 and 112 passes thru the frequency discriminating transformers 114 and 115 and operates into the two sets of rectifiers 116—117 and 118—119 which are so connected that the outputs are in opposition. This discrimination involves a double humped coupled circuit system so arranged, for example, that when the first grid of the pentode 111 is energized by a higher than average frequency the rectifier 117 is energized for the duration of the impulse on the third grid and when similarly energized by a lower than average frequency the rectifier 116 is similarly energized. As a result of the "back to back" connection of the outputs the grid of the triode 121 is energized with a voltage which depends upon the frequency of the oscillator 95 and therefore upon the angular setting of the shaft 31 and horn 22. In a similar manner the voltage on the grid of the triode 122 is dependent on the frequency of the oscillator 96 and therefore upon the angular setting of the shaft 31 and horn 22.

It is thus seen that a two phase voltage is produced on the grids of the two triodes 121 and 122 of a frequency corresponding to the rate of rotation of the shaft 31. The magnitude of these two voltages is dependent upon the strength of the impulse upon the third grids of the two pentodes 111 and 112 from the impulse generator 64 which has already been shown to be proportional to the frequency of the signal applied to the terminals 63. As this frequency is determined by the distance of the reflector 178 from the vessel 181 the magnitude of the voltages impressed upon the triodes 121 and 122 will be proportional to this distance.

The two phase signals produced by the triodes 121 and 122 are impressed upon the two sets of plates 142 and 141 respectively of the oscilloscope 16 with one set of plates for each phase. Under these circumstances any spot of light produced on the fluorescent screen 132 by the electron stream would describe a circle with a radius proportional to the strengths of the two phase signal. The degree of illumination of the spot depends upon the impulse voltage impressed upon the control grid 137 which controls the strength of the electron stream. Only the control grid 137 is varied in operation by the impulse from the impulse generator 64 which is transmitted thru the resistor 154, blocking condenser 152, resistor 153 and blocking condenser 151 to the grid 137.

As the strength of this impulse varies the limiter 155 is provided to prevent its exceeding a value necessary to give good illumination. The characteristics of this impulse are determined by the values of the condensers 151 and 152 and the resistors 153 and 154 which are so selected that the impulse will quickly produce the required amount of illumination but the grid 137 does not return to normal so quickly when the original impulse ceases.

It is thus seen that the impulse has two functions, first to determine how far from the center of the fluorescent screen 132 the spot of light will appear and second to cause the spot to appear by the action of the control grid.

The strengths of the two phase signals on the grids of the triodes 121 and 122 are dependent upon the strength of signal from the impulse generator 64. These triodes operate as D. C. amplifiers using resistance coupling into the deflection plates 141 and 142. The battery 126 feeds plate current thru the balancing potentiometer 125 and output resistors 123 and 124 to the plates of the triodes 121 and 122 respectively. The two potentiometers 125 and 128 are independently adjusted so that in the absence of signals the plates of the triodes 121 and 122 and the oscilloscope plates 141 and 142 are at ground potential. Thus in the absence of a signal the possible spot of light will be at the center of the fluorescent screen 132. The centering of the possible spot is accomplished by adjusting the position of the tap 146 of the potential divider 145 when there is no signal on the triodes 121 and 122.

When the device is operative, due to the reception of a signal reflected from the reflector 178, a spot will appear upon the fluorescent screen 132 at a distance from the center depending upon the strength of the impulse from the impulse generator 64, which in turn is dependent on the distance of the reflector 178, and at an angular bearing corresponding to the position of the shaft 31 at the instant that the reflected signal is received.

It is thus seen that a system is provided which will give a visible indication on the fluorescent screen 132 of the distance and angular bearing of the reflector 178 from the vessel 181. The distance may be measured on the screen 132 by means of the concentric circles 165 (Fig. 5) and its angular position with respect to the center line of the vessel 181 by relation to the radial lines 166 or its position with respect to the points of the compass by its relation to the compass card markings 164 on the plate 163. The method of operations described permits the system to be operated at a very slow speed if so desired.

It is to be understood that the method of producing the two phase currents at very low frequencies and the method of producing variable signal strength proportional to frequency are shown for purposes of illustration and the invention is not limited to these methods for producing the desired results. Also other means for measuring the distance of an object may be employed such as that described in an article published in the Proceedings of the I. R. E., July 1938, pp. 848–858, "Direct reading absolute altimeter."

In Fig. 9 is shown a modified form of transmitting and receiving apparatus. In this case a double horn 183 is mounted on the rotating shaft 31. In this horn are mounted two sets of dipoles 184 and 185. The dipoles 184 are connected thru slip rings or other means not shown to the secondary of the transformer 46, shown in Fig. 2, and the dipoles 185 are connected thru slip rings or other means not shown and thru a transformer 186 to the input circuit of a pentode amplifier 187. The output circuit of the pentode 187 is connected thru a transformer 188 to the diode circuit of a diode-triode tube 189. The output circuit of the triode portion of the tube 189 is connected thru a transformer 191 to the input terminals 63 of the impulse generator 64 shown in Fig. 2.

Operation of Fig. 9

In the operation of modified form of the invention shown in Fig. 9 frequency modulated energy from the transmitter 14 is radiated by the dipole 184. When this radiated energy strikes the reflector 178 some of it is reradiated back to the dipole 185 and is impressed upon the grid of the pentode amplifier 187 together with some of the energy received directly from the transmitter. The direct energy transfer from the transmitter to the grid of the pentode amplifier 187 may be obtained by inductive coupling between the transformers 46 and 186, or by any other well known means. Both of these energies are amplified in the pentode 187 and are impressed upon the diode portion of the tube 189 where they are rectified to produce an audio tone corresponding to the difference of the transmitted and reflected frequencies. This audio energy is amplified by the triode portion of the tube 189 and is impressed thru the transformer 191 upon the input terminals 63 of the impulse generator 64. From here on the operation is similar to that described in connection with Fig. 2.

A modified form of combining circuit is shown in Fig. 10 in which the secondary of the transformer 46 is connected to a circuit including a variable condenser 194, a variable resistor 195, the primary of the transformer 62 and two fixed condensers 196 and 197 which are shunted by the primary of a transformer 198. The secondary of the transformer 198 is connected to the transmission line 47—48.

Operation of Fig. 10

In the operation of the combining circuit shown in Fig. 10 energy from the transmitter 14 passes from the secondary of the transformer 46 to the transformer 198 and thence over the transmission line 47—48 to the dipole radiator 21. A very small portion of the transmitter energy, depending on the setting of the variable condenser 194 and variable resistor 195, is allowed to pass to the receiver. This energy is combined with the received energy to produce energy of audio frequency which is impressed, thru the transformer 62, upon the input circuit of the impulse generator 64.

Another modified form of combining circuit is illustrated in Fig. 11 in which the secondary of the transformer 46 is connected to a circuit comprising an inductance 201, two fixed condensers 202 and 203, two variable resistors 204 and 205 and the primary of the transformer 62. The transmission line 47—48 is connected to the midpoint of the inductance 201 and to ground.

Operation of Fig. 11

The operation of the modified combining circuit shown in Fig. 11 is similar to that shown in Fig. 10. Nearly all of the transmitter energy passes from the transformer 46 to the transmission lines 47—48. A small portion of the transmitter energy, however, depending on the adjustment of the variable resistors 204 and 205 is combined with the received energy and the resultant audio frequency energy passes thru the transformer 62 and is impressed upon the impulse generator 64.

A modified form of reflecting system for giving a code signal may be used as shown at 210 in Fig. 8. In this form of the invention four reflectors 211, 212, 213 and 214 are provided that are essentially similar to the reflector illustrated in Figs. 6 and 7. A fifth reflector 215 is provided, which has an elongated shape, but otherwise is constructed in a similar manner to the other four. These reflectors may be located along the shore as shown or at any other suitable position.

In this type of indicating system it is desirable to have an audible signal produced in the pilot house and for this purpose the circuit shown in Fig. 12 is connected across the terminals 216, and 217 of Fig. 2. This circuit comprises a triode 218 the output circuit of which includes the winding of a relay 219. The back contact of the relay 219 is connected in circuit with a battery 221, a buzzer 222 and a switch 223. The buzzer 222 may be located at any suitable place in the pilot house 11.

Operation of Fig. 12

In the operation of this form of the invention the grid of the triode 218 is normally at ground potential thus causing current to flow thru the relay 219 the contact of which will remain open. The horn 22 (Fig. 2) is rotated at a slower rate than previously described. As the radiation from this horn 22 sweeps the reflecting system 210 reflected signals of various length will be received corresponding to the horizontal dimensions of the reflectors 211—215. These signals will cause a spot of light to appear upon the fluorescent screen 132 as previously described. They will also cause a negative potential to be applied to the terminal 216 and thus to the grid of the triode 218. This negative potential will decrease the current flowing thru the relay 219 which will be de-energized. This will cause the back contact to close, which in turn will close the circuit from the battery 221 thru the buzzer 222, which will be sounded.

In this way not only will a spot of light appear on the fluorescent screen 132 to indicate the position of the reflecting system 210, but an audible signal will be produced in the pilot house 11 which will give the code signal of the reflecting system 210, which in this case is dot, dash, three dots so that the navigator may identify the particular reflecting system by this means.

A modified form of reflecting system is shown in Figs. 13 and 14 in which the metallic rods 171 are mounted in two plates 226 and 227 the former being rigidly secured to two uprights 228. The plate 227 is carried by two crossheads 229 which are mounted for vertical motion in two grooves 231 provided in the uprights 228. Springs 232 are mounted in the grooves 231 and tend to hold the crossheads 229 and plate 227 in their lowest position.

Secured to the cross heads 229 are pins 233 to which are pivoted members 234 which are mounted for vertical motion in brackets 235 attached to the uprights 228. Rotatably mounted on the lower ends of the members 234 are rollers 236 which engage cams 237, which in turn are secured to the ends of a shaft 238 rotatably mounted in the uprights 228. Secured to the shaft 238 is a worm wheel 239 which meshes with a worm 241 carried on the shaft of a motor 242 mounted on plate 243. The motor 242 is driven at constant speed from a suitable power supply 244. The cam 237 is provided with two short notches 245 and 246 and one long notch 247.

Operation of Figs. 13 and 14

In the operation of the reflecting system shown in Figs. 13 and 14, the motor 242 drives the cams 237 at a fairly slow speed by means of the worm 241, gear 239 and shaft 238. In the position shown in the figures the rollers 236 are in the notches 245 so that the plate 227 together with the corresponding rods 171 are in their lowest position. As the cams 237 rotate the rollers 236 will ride up on the elevation between the notches 245 and 246, thus elevating the plate 227 until at the highest point the rods 171 on the plate 227 engage corresponding rods 171 on the plate 226. As the cams 237 rotate further the rollers 236 move down into the notch 246 thus causing the two sets of rods 171 to be disengaged.

In this way the two sets of rods 171 are alternately engaged and disengaged the length of time and the spacing of the intervals when they are disengaged being determined by the shape and location of the notches 245, 246, and 247. In the example shown in Fig. 14 there would be two short intervals and a long interval followed by a considerable space.

When the two sets of rods 171 are separated they are tuned to the wave length of the energy radiated by the dipole 21 of Fig. 2 and will act as re-radiators of this energy, as already explained. When the two sets of rods are in engagement, however, they are detuned to this wave length and will not reradiate this frequency.

In the operation of this system the horn 22, shown in Fig. 2 is rotated manually until during its rotation it points directly at the reflector shown in Fig. 13 at which time a signal will be received back from the reflector and will cause the buzzer 222 to operate indicating the fact that the reflector has been picked up. The horn 22 is thereafter maintained on the reflector and the buzzer 222 will be caused to operate every time that the two sets of rods 171 are separated. In this way the buzzer 222 will be caused to emit a signal corresponding to the notches cut on the cam 237, which in this case is two dots and a dash. The location of the reflector will be indicated on the fluorescent screen 132 as already described.

In this manner the position and identity of the reflector may be determined. These detuning reflectors may be located at any desired point such as on buoys and will serve to identify the particular buoy in a manner similar to the way buoys are at present identified by a specific series of flashing lights.

In passing up a channel it may be desirable to be able to differentiate the buoys on the left side of the channel from the buoys on the right side and have this difference indicated on the position indicator shown in Fig. 5. This may be accomplished by the use of two directional horn antenna systems and two sets of transmitters and receivers each of which would radiate a different frequency modulation, such for example as L and R.

The buoys 176 (Fig. 8) on the left side of the channel may be provided with reflectors which are tuned to the L frequency and the reflectors on the buoys 177 on the right are tuned to the R frequency. The signals reflected from the buoys 176 are received by the receiver tuned to the L frequency and operate an L oscilloscope in a manner previously described. The signals reflected from the buoys 177 are received by the receiver tuned to the R frequency and operate an R oscilloscope.

The operation of the selective reflector is indicated in Fig. 8 in which the L frequency energy from the vessel 181 is indicated by the —.—. line 251 and the reflected L frequency energy from the buoy 176 is shown by the —.—. line 252. The R frequency energy is indicated by the — —..— —.. line 253, but as this is not reflected from the buoy 176 there is no corresponding line shown returning to the vessel 181. The reverse action is shown in connection with the buoy 177 where the L frequency energy is indicated by the line 254 and the R frequency energy by the line 255. The reflected R frequency energy is shown by the line 256. The two L and R oscilloscopes may be so arranged in conjunction with a system of mirrors or prisms that the two spots of light on the fluorescent screens of the two oscilloscopes may be projected on a single viewing screen. The fluorescent screens of the L and R oscilloscopes may be coated with suitable materials so that the spot on the L oscilloscope screen appears red and the spot on the R oscilloscope appears green. This effect may also be accomplished by the use of red and green color filters.

In this way the positions of the buoys on the left side of the channel are indicated by red spots on the screen and the buoys on the right side of the channel are indicated by green spots on the screen, thus clearly indicating the location of the channel.

A modified form of reflector is depicted in Fig. 15 which is so designed that the radio waves received by it are reflected in a given direction. This reflector is preferably constructed of a plurality of rods 261 similar to the rods 171 of Figs. 6 and 7 which are mounted in a plate 262 of insulating material supported by uprights 263. The rods are preferably arranged in a straight line 264 and spaced a wave length apart.

Operation of Fig. 15

In the operation of the reflecting system illustrated in Fig. 15 if the transmitted wave impinges upon the series of rods 261 in a direction indicated by the line 265 which is perpendicular to the line 264 then the reflected waves from all the rods 261 will be in phase and a maximum of reflected energy will be reflected back along the line 265. If the transmitted energy strikes the rods 261 in any other direction than perpendicular to the line 264 the energy reflected from the various rods 261 will be of different phase and will not produce a maximum effect.

If a set of the rods 261 forming a directional reflector is mounted as indicated at 266 in Fig. 8 the line 267 perpendicular to the set of rods 261 will be the line of maximum reflection or range of the reflector 266. As shown in Fig. 8 the vessel 181 is on this line and therefore the receiving system will receive a signal of maximum intensity indicating that the vessel is on the range 267. The vessel 181 may then proceed up the channel 175 by following this range until it arrives at the point 268 which is opposite a second directional reflector 269 the range of which is indicated by the line 271. At the point 268 the receiving system on the vessel 181 will receive a strong signal reflected from the directional reflector 269 thus indicating that the vessel 181 has reached the point 268 where it is no longer safe to follow the range 267. The vessel 181 will then pick up another range 272 from a directional reflector not shown and will proceed up the new course in the channel 175. In this way a vessel may proceed up a channel in a dense fog by the use of a series of radio reflection ranges.

In Fig. 16 is illustrated a system for identifying vessels and their direction of travel by means of radio reflection. In this system a vessel 274 is equipped with a plurality of reflectors as indicated at 275—278. The arrangement of these reflectors may indicate the type of vessel on which they are mounted, such for example as a cruiser, merchantman, destroyer, etc.

Operation of Fig. 16

In the operation of the system depicted in Fig. 16 as the beam of radiation from the horn 22 sweeps across the vessel 274 some of the radiation will be reflected back to the horn 22 and will produce a pattern on the fluorescent screen 132 corresponding to the arrangement of the reflectors 275—278. This pattern will indicate not only the type of vessel which for example may be a cruiser but also the direction in which the vessel is travelling. Thus if the pattern shown on the screen 132 is . . _ _ . it will indicate that the vessel 274 is travelling to the left and if the pattern shown is . _ _ . . it will indicate that the vessel is headed to the right.

Other types of vessels may be equipped with different arrangements of reflecting systems. Thus, for example, a merchantman might have the arrangement _ _ . . and a destroyer _ _ _ . . It is thus seen that by means of this system not only the type of vessel but its direction of heading may be ascertained.

Although only a few of the various forms in which this invention may be embodied have been shown herein, it is to be understood that the invention is not limited to any specific construction but may be embodied in various forms without departing from the spirit of the invention as defined by the appended claims.

What is claimed is:

1. A navigational guide system for vessels comprising a directional radio beam radiator, an oscillator feeding said radiator, frequency modulation means modulating said oscillator to cause the radiated waves to vary in frequency in a predetermined manner, means rotating said radiator for causing said beam to sweep an area, a remote reflector in said area selective to said beam and adapted to reradiate the same when energized thereby, a receiver on said vessel responsive to said reradiated beam and including a combining circuit for combining the received wave with the transmitted wave to obtain therefrom a beat frequency which constitutes a measure of the distance to said remote reflector, a converter circuit converting said beat frequency into impulses modulated in amplitude in accordance with variations in said beat frequency, repeater mechanism responsive to the rotational movement of said radiator, and indicator mechanism responsive to said amplitude modulated impulses to indicate the varying amplitude thereof as a measure of the distance to said remote reflector and responsive to said repeater to indicate the angular position of said radiator when said impulse is obtained.

2. A navigational guide system for vessels comprising a directional radio beam radiator, an oscillator feeding said radiator, frequency modulation means modulating said oscillator to cause the radiated waves to vary in frequency in a predetermined manner, means rotating said radiator for causing said beam to sweep an area, a remote reflector in said area selective to said beam and adapted to reradiate the same when energized thereby, a receiver on said vessel responsive to said reradiated beam and including a combining circuit for combining the received wave with the transmited wave to obtain therefrom a beat frequency which constitutes a measure of the distance to said remote reflector, a converter circuit converting said beat frequency into impulses modulated in amplitude in accordance with variations in said beat frequency, repeater mechanism responsive to the rotational movement of said radiator, and indicator mechanism responsive to the combined effect of said repeater mechanism and said amplitude modulated impulses to indicate the amplitude of said impulse and the angular position of said radiator at the instant of said impulse.

3. A navigational guide system for vessels comprising a directional radio beam radiator, an oscillator feeding said radiator, frequency modulation means modulating said oscillator to cause the radiated waves to vary in frequency in a predetermined manner, means rotating said radiator for causing said beam to sweep an area, a remote reflector in said area selective to said beam and adapted to reradiate the same when energized thereby, a receiver on said vessel responsive to said reradiated beam and including a combining circuit for combining the received wave with the transmitted wave to obtain therefrom a beat frequency which constitutes a measure of the distance to said remote reflector, a converter circuit converting said beat frequency into impulses modulated in amplitude in accordance with variations in said beat frequency, repeater mechanism responsive to the rotation movement of said radiator and an indicating device comprising a cathode ray oscilloscope having means to deflect said ray in a controlled circular path about a center point, circuits controlled by said repeater mechanism to cause said ray to follow in its circular path the rotational movement of said radiator, circuits actuated by said amplitude modulated impulses to deflect said ray radially by an amount proportional to the amplitude of said impulses, and circuits responsive to said impulses to produce said ray only at the instant of said impulses whereby a spot is produced thereby displaced from said center point by a distance and in a direction corresponding to that of said remote reflector.

4. A navigational guide system for vessels comprising a directional radio beam radiator, an oscillator feeding said radiator, frequency modulation means modulating said oscillator to cause the radiated waves to vary in frequency in a predetermined manner, means rotating said radiator for causing said beam to sweep an area, a remote reflector in said area selective to said beam and adapted to reradiate the same when energized thereby, a receiver on said vessel responsive to said reradiated beam and including a combining circuit for combining the received wave with the transmitted wave to obtain therefrom a beat frequency which constitutes a measure of the distance to said remote reflector, a converter circuit converting said beat frequency into impulses modulated in amplitude in accordance with variation in said beat frequency, an indicating device comprising a cathode ray oscilloscope having a control electrode for controlling the emission of said ray and pairs of angularly disposed deflector electrodes for controlling the angular displacement of said ray from a central point, repeater mechanism responsive to the angular position of said radiator and connected to energize said deflector electrodes to cause said ray to take an angular position corresponding to the orientation of said radiator, means normally applying a biasing potential to said control electrode to block the emission of said ray, and means connecting said converter circuit to said repeater and to said control electrode to apply to said electrode a potential suited to unblock said tube to cause said ray to be emitted and to apply to said repeater a potential corresponding to the amplitude modulation of said circuit, whereby the ray is deflected by said deflector electrodes a radial distance proportional to said amplitude modulation and in a direction corresponding to the orientation of said radiator at the instant the reflected wave is received.

5. A system as set forth in claim 4 in which said repeater includes amplifier tubes connected to apply a potential to said deflector electrodes which varies in phase with the radiator position and said converter circuit is connected to control the operation of said amplifier tubes in accordance with the impulse amplitude.

6. In a system as set forth in claim 3, a rotatably mounted scale associated with said oscilloscope to indicate the deflection of said spot and means for orienting said scale to designate compass directions.

7. A system as set forth in claim 1 in which said converter circuit comprises an amplifier circuit, an output limiter device to produce a constant amplitude frequency modulated current, a frequency discriminator circuit converting said frequency modulated current into a corresponding amplitude modulated current, and an impulse circuit energized by said last current to produce impulses varying in amplitude in accordance with said amplitude modulations.

8. A navigational guide system for a vessel, comprising a plurality of sources of different directional radio beams on said vessel each adapted to be rotated to sweep an area, frequency modulation means for modulating each of said sources to cause said beams to vary in frequency in a predetermined manner, a plurality of remote reflectors in said area comprising two groups, each group being selective only to one of said beams and adapted to reradiate the same when energized thereby, said reflectors constituting left and right course markers having different reradiating characteristics, a plurality of receivers on said vessel each responsive to said reradiated beams having one of said characteristics and including circuits responsive to the time lag between said radiated and said corresponding reradiated beams, and indicating mechanism actuated by said circuits, said indicating mechanism having means to indicate both the direction of each of said reradiated beams and the distance of each of said reflectors from said vessel.

9. A navigational guide system for a vessel comprising a plurality of directional radio beam radiators, a plurality of oscillators each feeding one of said radiators, frequency modulation means modulating each of said oscillators to cause the radiated waves to vary in frequency in a predetermined manner, means rotating each of said radiators for causing said beams to sweep an area, a plurality of remote reflectors in said area each selective to one of said beams and adapted to reradiate the same when energized thereby, said reflectors constituting left and right course markers having different reradiating characteristics, a plurality of receivers on said vessel each responsive to said reradiated beams having one of said characteristics, and each including, in combination, a combining circuit for combining one of the received waves with a corresponding one of the transmitted waves to obtain therefrom a beat frequency which constitutes a measure of the distance to one of said remote reflectors, a converter circuit for converting said beat frequency into impulses modulated in amplitude in accordance with variations in said beat frequency, repeater mechanism responsive to rotational movement of one of said radiators, and indicator mechanism responsive to said amplitude modulated impulses to indicate the varying amplitude thereof as a measure of the distance to one of said remote reflectors and responsive to said repeater to indicate the angular position of one of said radiators when said impulse is obtained.

10. A system of the type described in claim 1 characterized in that said combining circuit includes a bridge network electrically interposed between said oscillator, said directional beam radiator and said receiver; said network providing predetermined direct energy transfer from said oscillator to said receiver.

11. A system as defined in claim 1 wherein said remote reflector includes means periodically rendering the same inoperative whereby the operative periods form identifying signals.

12. A system as defined in claim 1 wherein said remote reflector is normally tuned to reradiate a predetermined received beam and contacting means for detuning said reflector periodically in accordance with a selected code to form identifying signals.

JOHN HAYS HAMMOND, Jr.